US012019618B2

(12) United States Patent
Tripathi et al.

(10) Patent No.: US 12,019,618 B2
(45) Date of Patent: Jun. 25, 2024

(54) PRECHECKING FOR NON-DISRUPTIVE UPDATE OF A DATA MANAGEMENT SYSTEM

(71) Applicant: Rubrik, Inc., Palo Alto, CA (US)

(72) Inventors: Shashwat Tripathi, Bengaluru (IN); Kesavan Palanichamy, Bengaluru (IN); Arvind Batra, Bengaluru (IN); Muthugopalakrishnan Adiseshan, Bengaluru (IN); Vikas Madhusudana, Bengaluru (IN)

(73) Assignee: Rubrik, Inc., Palo Alto, CA (US)

( * ) Notice: Subject to any disclaimer, the term of this patent is extended or adjusted under 35 U.S.C. 154(b) by 102 days.

(21) Appl. No.: 17/948,150

(22) Filed: Sep. 19, 2022

(65) Prior Publication Data

US 2024/0095230 A1 Mar. 21, 2024

(51) Int. Cl.
*G06F 7/02* (2006.01)
*G06F 8/65* (2018.01)
*G06F 16/00* (2019.01)
*G06F 16/23* (2019.01)

(52) U.S. Cl.
CPC ............ *G06F 16/2365* (2019.01); *G06F 8/65* (2013.01)

(58) Field of Classification Search
CPC ............................... G06F 16/2365; G06F 8/65
See application file for complete search history.

(56) References Cited

U.S. PATENT DOCUMENTS

| 2019/0050296 A1* | 2/2019 | Luo ..................... G06F 11/1456 |
| 2020/0174779 A1* | 6/2020 | David ..................... G06F 8/654 |
| 2022/0276856 A1* | 9/2022 | Guo ..................... H04L 67/1097 |

FOREIGN PATENT DOCUMENTS

CN 114610354 A * 6/2022

* cited by examiner

*Primary Examiner* — Bruce M Moser
(74) *Attorney, Agent, or Firm* — Holland & Hart LLP

(57) ABSTRACT

Aspects of data management are described. Information for updating a cluster of storage nodes to a second version may be obtained. Based on obtaining the information, a cluster-level precheck procedure may be performed prior to initiating an update procedure for the cluster of storage nodes. Also, during the update procedure, a node-level precheck procedure may be performed prior to initiating an update of a storage node to determine whether the storage node is in a state for successful update. Based on a result of the node-level precheck, a determination of whether to delay the update of the storage node may be made.

20 Claims, 7 Drawing Sheets

PRECHECKING FOR NON-DISRUPTIVE UPDATE OF A DATA MANAGEMENT SYSTEM

FIELD OF TECHNOLOGY

The present disclosure relates generally to data management, including techniques for prechecking for non-disruptive update of a data management system.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

The software of a data management system that includes multiple storage nodes may be updated to a new software version. In some examples, a "disruptive" update procedure is used to update the data management system, where the disruptive update procedure may update each of the storage nodes in parallel. In such cases, the data management system may become unavailable during a disruptive update procedure—e.g., while all of the storage nodes install the new software version. In other examples, a "non-disruptive" update procedure is used to update the data management system, where the non-disruptive update procedure may update the storage nodes (or groups of the storage nodes) of the data management system one-at-a-time. Thus, the storage nodes not currently being updated may continue to support the services provided by the data management system during the update procedure.

Prior to performing an update procedure, a data management system may perform prechecking procedures to determine whether the data management system is prepared to be updated. In some examples, the prechecking procedures may be either for a disruptive update procedure or for a non-disruptive update procedure. In some examples, based on a result of the prechecking procedure, it may be determined that the data management system is not prepared to be updated using the update procedure corresponding to the prechecking procedure, and the corresponding update procedure may be prevented from proceeding.

To increase a likelihood that an update procedure can proceed, first prechecking procedures for a disruptive update procedure and second prechecking procedures for a non-disruptive update procedure may both be performed prior to initiating an update procedure. In such cases, whether to update the storage nodes with a disruptive update procedure or a non-disruptive update procedure may be determined based on a result of the first prechecking procedures and the second prechecking procedures. For example, the update may proceed as a disruptive update if the first prechecking procedures pass and the second prechecking procedures fail.

Since a non-disruptive update procedure updates storage nodes (or groups of storage nodes) on a one-by-one basis (during a rolling update portion of the non-disruptive update), a duration of a non-disruptive update procedure may extend for hours. Accordingly, in some examples, a state of a storage node may change during the execution of the non-disruptive update procedure—e.g., such that the storage node may no longer prepared to be updated. Thus, in some examples, the non-disruptive update procedure may fail even if an initial prechecking procedure completes successfully. To reduce a likelihood of a non-disruptive update procedure failing after a successful initial prechecking procedure, individual node-level prechecks may be performed during a rolling update portion of the non-disruptive update procedure and prior to updating each of the storage nodes.

Figure 1:
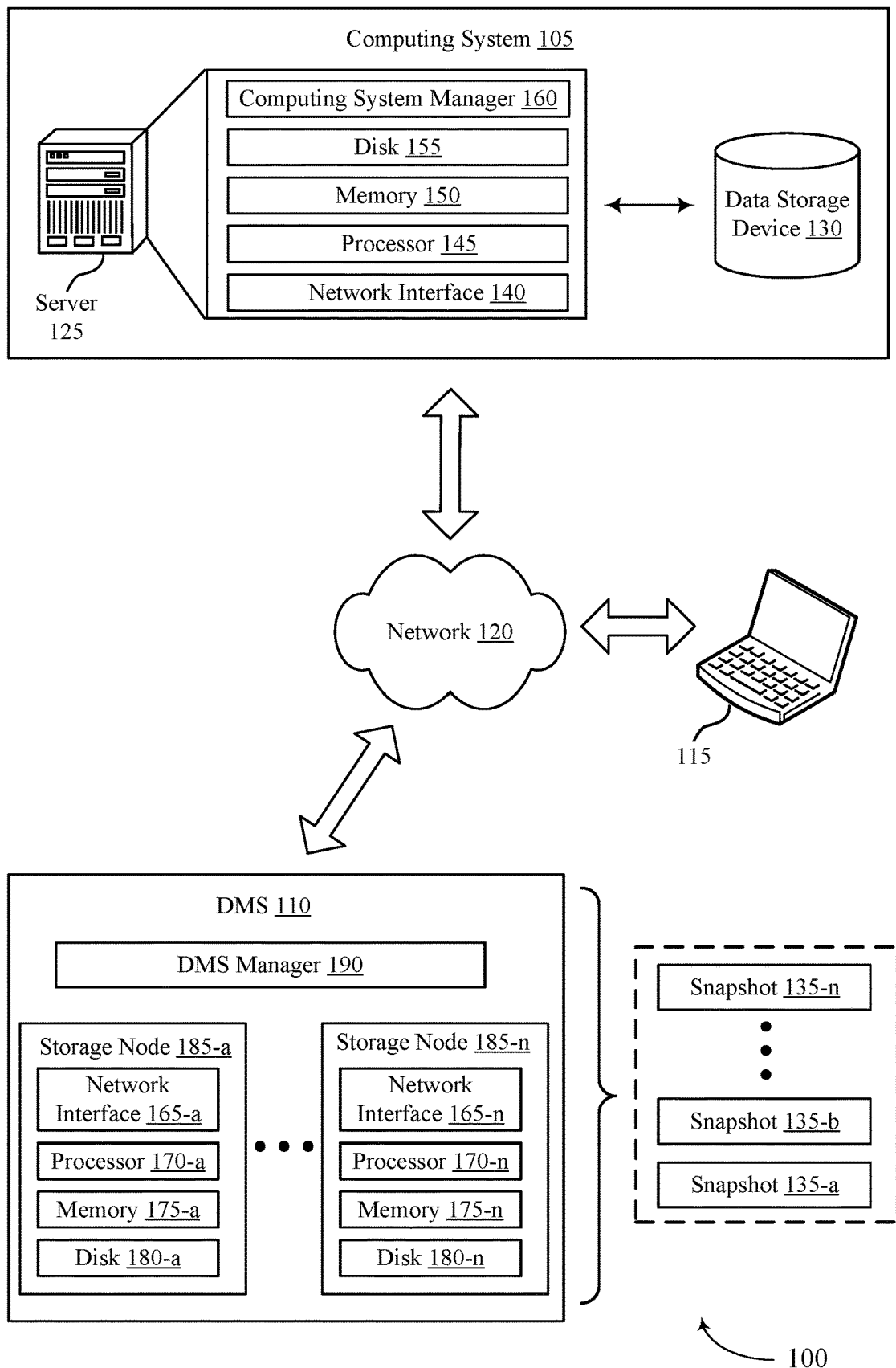
FIG. 1 shows an example of a computing environment that supports prechecking for non-disruptive update of a data management system in accordance with aspects of the present disclosure.

FIG. 1 illustrates an example of a computing environment 100 that supports a non-disruptive update for a data management system in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

A storage cluster at the DMS 110 may be updated (e.g., upgraded) from a first software version to a second software version—e.g., to improve performance, stability, and/or security; to add new services; etc. As part of the procedure for updating the storage cluster, each of the storage nodes 185 may be updated from the first software version to the second software version. To perform the update procedure, each of the storage nodes may be taken offline while the update procedure is performed. A duration for performing the update procedure may last tens of minutes or hours. Accordingly, the services provided by the storage cluster may be temporarily unavailable until the update procedure is completed. An update procedure that causes the storage cluster to be taken offline may be referred to as a "disruptive" update procedure or a fast update procedure.

Alternatively, a "non-disruptive" update procedure may be performed to update the storage cluster. As part of the non-disruptive update procedure, individual (or groups of) storage nodes may be updated from the first software version to the second software version (e.g., on a serial or one-by-one basis). A procedure for serially updating the storage nodes may be referred to as a rolling update procedure. Accordingly, the storage cluster may continue to provide services (remain online) throughout the update procedure. That is, the storage nodes not being currently updated may be used to support the services provided by the storage cluster. Since a non-disruptive update procedure may involve individually updating the storage nodes 185 (or groups of the storage nodes 185), a duration for performing the non-disruptive update procedure may last hours or days. For example, the duration of the non-disruptive update procedure may include the collective time of individually updating each of the storage nodes 185.

In some examples, the DMS manager 190 may obtain information for updating the storage nodes 185 to a second software version. Based on obtaining the information, the DMS manager 190 may perform a cluster-level precheck procedure prior to initiating an update procedure for the storage nodes 185. In some examples, the DMS manager 190 may also perform node-level precheck procedures prior to initiating the update procedure for the storage nodes 185. In some examples, the DMS manager 190 may proceed with the update procedure based on a result of the precheck procedures—e.g., based on determining that the cluster of storage nodes and the individual storage nodes are in states that support the successful completion of the update. As described herein, based on initiating a non-disruptive update procedure, the storage nodes 185 (or groups of the storage nodes 185) may be updated on a one-by-one basis. In some examples, prior to initiating an update for a storage node (or a group) of the storage nodes 185, the DMS manager 190 (or a "driving storage node" of the storage nodes 185 that is designated as the driving node for the update procedure) may perform a node-level precheck procedure to determine whether the storage node is still in a state for successful update. Based on a result of the node-level precheck procedure, a determination of whether to delay the update of the storage node may be made. For example, the update of the storage node may be delayed if the node-level precheck indicates that the storage node is no longer in the state for successful update.

Figure 2:
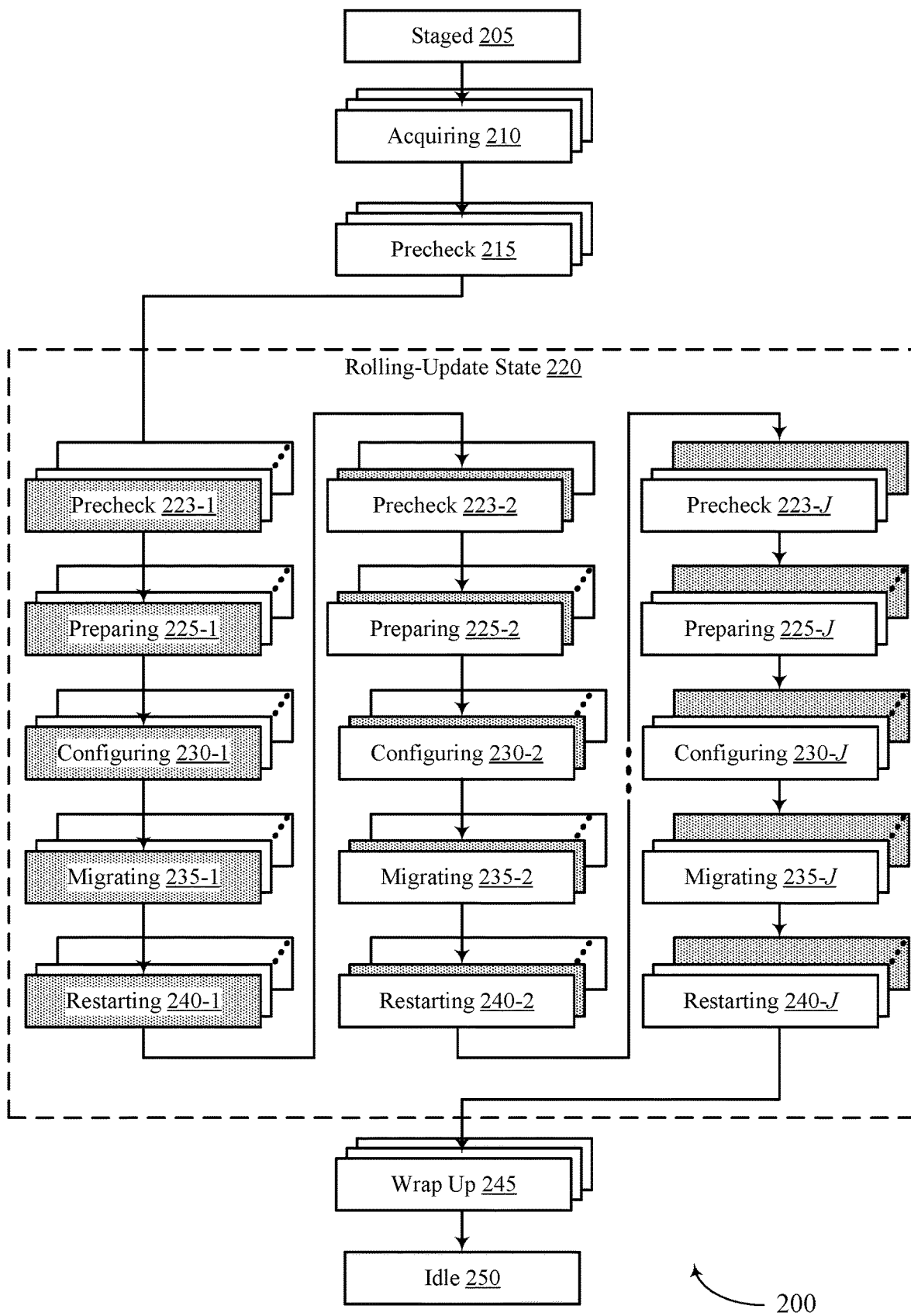
FIG. 2 shows an example of a state diagram that supports prechecking for non-disruptive update of a data management system in accordance with examples as disclosed herein.

FIG. 2 shows an example of a state diagram that supports prechecking for non-disruptive update of a data management system in accordance with examples as disclosed herein.

The state diagram 200 may depict the different states of a data management cluster during a non-disruptive update procedure. The state diagram 200 may include cluster-wide states that include first tasks that are performed on the storage nodes collectively, and node-level tasks that are performed on storage nodes individually. The state diagram 200 may depict the operation of a cluster-wide state machine associated with the data management cluster as well as one or more nested node-level state machines associated with the storage nodes. A nested node-level state machine may also be referred to as a rolling update (RU) state machine.

Based on receiving an indication that an update for the data management cluster is available, the cluster-wide state machine and the data management cluster may enter the staged state 205. Based on entering the staged state 205, the data management cluster may be ready for a procedure for non-disruptively updating the data management cluster from a first software version to a second software version to be initiated. In some examples, prior to entering the staged state 205, the data management cluster may download the update and confirm an integrity of the update, for example. In some examples, each storage node in the data management cluster may concurrently (e.g., simultaneously) transition to the staged state 205 together.

After the staged state 205 is entered and the rolling update is initiated, the cluster-wide state machine and data management cluster may enter the acquiring state 210. Based on entering the acquiring state 210, the data management cluster may acquire an update-lock protecting the data management cluster from changes that would interfere with the rolling update process. In some examples, each storage node in the data management cluster may concurrently (e.g., simultaneously) transition to the acquiring state 210 together.

In some examples, before proceeding with the rolling update, the cluster-wide state machine and the data management cluster may enter the precheck state 215. While in the precheck state 215, the data management cluster may perform one or more checks to determine whether to proceed with the rolling update. In some examples, the data management cluster performs one or more cluster-wide (or system-wide) checks to determine whether to proceed with the rolling update. Additionally, or alternatively, the data management cluster may perform one more individual node-level checks to determine whether to proceed with the rolling update. In some examples, a deploying state may be inserted between the acquiring state 210 and the precheck state 215. The deploying state may be used to deploy the update to the storage nodes.

Based on passing the prechecks and/or addressing any outstanding items raised by the prechecks, a status of the storage nodes may be set to OK (which may indicate to the services being run by the data management cluster that the storage node is available to support the services), and the cluster-wide state machine and the data management cluster may enter the rolling update state 220. Based on entering the rolling update state 220, a plan for updating the data management cluster may be determined. For example, the plan may designate an order for updating the storage nodes (e.g., individually or in groups). Also, a node-level finite state machine (which may be referred to as a state machine) may be instantiated. In some examples, a state machine is instantiated for each storage node (e.g., of N storage nodes) or for sets of the storage nodes in the data management cluster. Though, in some examples, the state machines may be instantiated prior to entering the rolling update state 220 (e.g., when the staged state 205 is entered). Based on instantiating the state machines, the states of the state machines and state handlers for the various states may be established.

The states of the individual state machines may be represented by the overlaid boxes, such that the frontmost boxes may correspond to a first state machine for a first storage node, the intermediary boxes may correspond to a second state machine for a second storage node, and the backmost boxes may correspond to a third state machine for an Nth storage node. Each state machine may include a preparing state, a configuring state, a migrating state, and a restarting state. In some examples, each state machine may also include a done state to indicate that the update at a corresponding node is complete.

The state machines may perform the tasks of some states in parallel. That is, the storage nodes may perform the tasks of some states concurrently—e.g., one or more tasks of the preparing state. While the tasks of other states may be performed serially. That is, the storage nodes may not perform certain tasks until certain tasks are completed by a particular storage node—e.g., one storage node may not perform the tasks of the configuring, migrating, and restarting states until a particular storage node completes the tasks of the configuring, migrating, and restarting states; another storage node may not perform the tasks of the configuring, migrating, and restarting states until the one storage node completes tasks of the configuring, migrating, and restarting states, and so on. In some examples, which tasks are performed by the storage nodes serially or in parallel may be modified by modifying the operation of the individual nested state machines. In some examples, for each task performed for a state machine, a file may be updated before and after the task is performed to record the current state and quantity of tasks performed by each node. After completing the tasks of a current state, a state machine may proceed to the next state. In some examples, if the state machine encounters an error, the state machine, the rolling update, or both, may be paused.

After the rolling update state 220 is entered and the state machines are instantiated, a first state machine at the first storage node may enter the preparing state. In some examples, based on entering the first preparing state 225-1, the first storage node corresponding to the first state machine may stop providing services and identify ongoing jobs for the services. Also, a status of the first storage node may be set to UPDATE (to indicate that the first storage node is being updated). In some examples, the first storage node may perform a quick reboot. While the first storage node is in the first preparing state 225-1, a status of the other storage nodes corresponding to the other state machines may be set to OK. While the OK status is set, the other storage nodes may continue to execute ongoing jobs to support services provided by the data management cluster.

The first state machine and the first storage node may then proceed to the first configuring state 230-1. While in the first configuring state 230-1, the first storage node may configure a secondary partition with system settings, apply platform specific changes, and perform a regular reboot. In some examples, the first storage node may make additions and/or modifications to the configuration of an operating system of the first storage node, the data management software of the first storage node, or both. In some examples, the first storage node may make additions and/or modifications to the configuration of virtual machines, physical machines, or both. A configuration may include configuration parameters, where each configuration parameter may have a specified value.

Based on updating the configurations, the first state machine and the first storage node may then proceed to the first migrating state 235-1. While in the first migrating state 235-1, the first storage node may prepare the updated software version for operation. For example, the first storage node may convert existing data into different forms; populate, modify, or remove a schema added in the updated software version; populate, modify, or remove entries of a schema modified in the updated software versions; and the like.

After initializing the updated software version, the first state machine and first storage node may enter the first restarting state 240-1. While in the first restarting state 240-1, the first storage node may restart itself—e.g., so that the first storage node (the services provided by the first storage node) may begin operating in accordance with the updated software version. In some examples, after successfully restarting, the first state machine and the first storage node may transition to a done state and a status of the first storage node may be reset to OK.

Based on the first storage node successfully restarting, a next state machine and a next storage node may enter and perform the tasks of the second preparing state 225-2. Also, a status of the next storage node may be set to UPDATE. After completing the tasks of the second preparing state 225-2, the next state machine and the next storage node may proceed through the second configuring state 230-2, the second migrating state 235-2, and the second restarting state 240-2 of the second state machine, as similarly described with reference to the first storage node. Based on the next storage node successfully restarting, a following state machine and following storage node may proceed through the tasks of the preparing and subsequent states. And so on—e.g., until all of the storage nodes have been updated.

Based on a last storage node (e.g., the $J^{th}$ storage node 225-J) exiting the last restarting state (e.g., the $J^{th}$ restarting state 240-J), the cluster-wide state machine may proceed to the wrap-up state 245. In some examples, the $J^{th}$ storage node 225-J is the storage node that drives the rolling update procedure (and may be referred to as the driving node). While in the wrap-up state 245, certain data in the storage nodes may be deleted (e.g., cleaned-up)—e.g., data that is preferable not to delete during the rolling update, such as old or obsolete metadata, system configurations, and the like. In some examples, destructive schema changes may also be performed while in the wrap-up state. Additionally, an update status of OK may be designated for the data management cluster (to indicate that the rolling update was completed successfully). After completing the wrap-up operations, the cluster-wide state machine may proceed to the idle state 250.

As described herein, cluster-level and/or node-level prechecks may be performed (e.g., while the cluster-level state machine is in the precheck state 215) prior to proceeding with an update. For example, the cluster-level and/or node-level prechecks may indicate whether to initiate the rolling update portion of a non-disruptive update. In some examples, based on the result of the prechecks, the data management cluster may issue an alert (e.g., via a user interface to a user) that the non-disruptive update has been canceled or paused. The alert may also indicate items that, if addressed, may enable the non-disruptive update to proceed.

In some examples, rather than performing prechecks for only one type of update procedure (e.g., a non-disruptive update procedure), prechecks for multiple types of update procedures (e.g., a disruptive update procedure, a non-disruptive update procedure, etc.) may be performed—e.g., while the cluster-level state machine is in the precheck state 215. Accordingly, a determination of whether to proceed with a disruptive update or a non-disruptive update may be made based on the result of the prechecks. In some examples, based on the results of the first set and second set of prechecks, the data management cluster may indicate (e.g., via a user interface) whether the data management procedure is prepared to execute one or both of the update procedures. In such cases, the data management cluster may perform the update procedure received (e.g., via the user interface) in a message (e.g., based on the user selecting the update procedure that is ready for execution). In some examples, the data management cluster may be configured (e.g., by a prior user selection) to perform a first type of update procedure (e.g., a non-disruptive update procedure) and may determine, based on the results of the prechecks, that the data management cluster is not prepared to execute the first type of update procedure but is prepared to execute a second type of update procedure (e.g., a disruptive update procedure). In such cases, the data management cluster may indicate (e.g., via a user interface) to a user that the first type of update procedure has been canceled or paused but that the data management cluster is prepared to proceed with the update of the second type of update procedure is selected.

By concurrently performing a first set of prechecks for a first type of update procedure and a second set of prechecks for a second type of update procedure, a data management cluster may provide a user with an opportunity to select between different types of update procedures (e.g., in the event that a user would prefer to use a different update procedure for a particular update instance, in the event that a preferred update procedure is blocked from proceeding, etc.). In some examples, performing both types of prechecks, may enable an update procedure to proceed for a data management cluster without user intervention—e.g., even if a preferred update procedure is blocked from proceeding.

As described herein, a duration of a non-disruptive update may extend for hours. Accordingly, a state of the data management cluster may change during the execution of the non-disruptive update and after prechecks indicating that the non-disruptive update is ready for execution have passed. For example, a storage capacity of a storage node may be reduced below a threshold before the storage node is updated such that the storage node is no longer prepared to install the update by the time the rolling update reaches the storage node. Additionally, or alternatively, a network configuration (e.g., a floating IP capability) may be changed during the update procedure such that the data management cluster is unable to complete the update procedure. In such cases, the update procedure may pause or fail for reasons that are unknown to the update procedure (e.g., if only the initial prechecks are performed). In some examples, proceeding with the update of a storage node that is no longer capable of being updated may cause system errors that require on-site maintenance to be corrected.

To reduce a likelihood of errors during an update procedure, individual node-level prechecks may be performed prior to updating each storage node in the data management cluster. In some examples, the state machines used to track the progress of an update in an individual storage node may be configured to include a precheck state 223 that occurs prior to the preparing state 225.

In some examples, a node-level precheck performed during a rolling update may determine that a storage node is not prepared to be updated (e.g., due to a lack of storage space, an incorrect network configuration, etc.). Based on determining that the storage node is not prepared to be updated, the data management cluster may indicate (e.g., via a user interface) that the storage node is not prepared to be updated. The indication may also indicate a cause of the determination that the storage node is not prepared to be updated and prompt a user to correct the issue. In some examples, the data management cluster may receive (via the user interface) an indication that the issue has been corrected. Based on the receiving the indication that the issue has been corrected and, in some examples, confirming that the issue has been corrected, the data management cluster may proceed with updating the storage node.

By performing a node-level precheck prior to updating each storage node, update errors caused by changes to the system that occur after the initial set of prechecks may be identified and addressed. Additionally, the node-level prechecks may be used to pause the update procedure prior to updating a storage node, such that the update procedure can proceed with that storage node once the identified errors are addressed.

Figure 3:
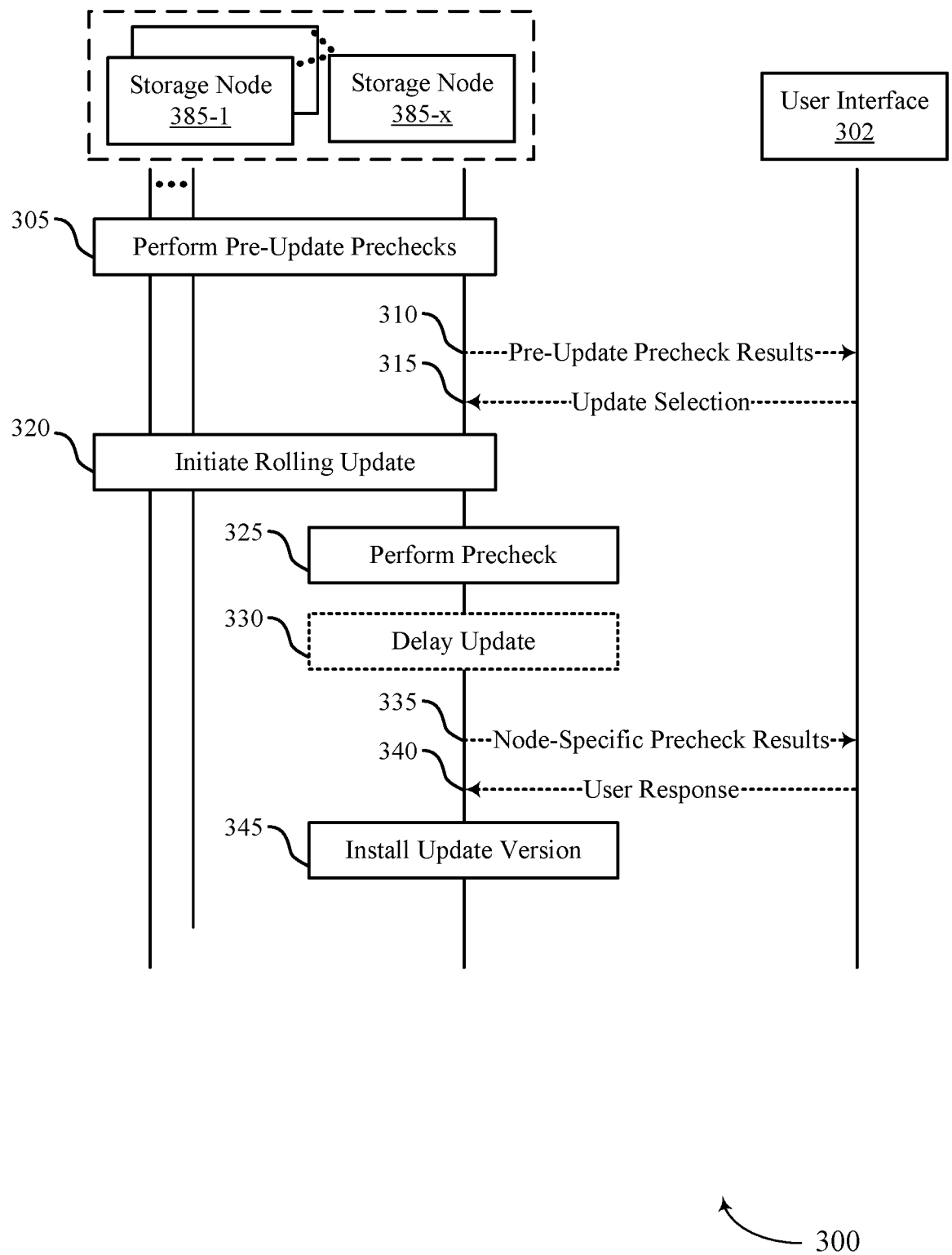
FIG. 3 shows an example of a set of operations for prechecking for non-disruptive update of a data management system in accordance with examples as disclosed herein.

FIG. 3 shows an example of a set of operations for prechecking for non-disruptive update of a data management system in accordance with examples as disclosed herein.

The process flow 300 may be performed by a data management cluster including multiple storage nodes, which may be respective examples of the storage nodes described herein. In some examples, the process flow 300 shows an example set of operations performed to support prechecking for non-disruptive update of a data management system. For example, the process flow 300 may include operations for performing prechecks for both a disruptive and non-disruptive update procedure and for performing node-specific prechecks during a non-disruptive update procedure.

Aspects of the process flow 300 may be implemented by a controller, among other components. Additionally, or alternatively, aspects of the process flow 300 may be implemented as instructions stored in memory (e.g., firmware stored in a memory coupled with a controller). For example, the instructions, when executed by a controller, may cause the controller to perform the operations of the process flow 300.

One or more of the operations described in the process flow 300 may be performed earlier or later, omitted, replaced, supplemented, or combined with another operation. Also, additional operations described herein may replace, supplement or be combined with one or more of the operations described in the process flow 300.

At 305, update prechecks may be performed prior to updating a data management cluster (e.g., by the data management cluster or a driving storage node designated the update). In some examples, the update prechecks are performed after an update is initiated for the data management cluster (e.g., automatically or triggered by a user). In some examples, the update prechecks may be performed while the data management cluster is in a precheck state (such as the precheck state 215).

The update prechecks may include a first set of cluster-level prechecks used to determine whether the data management cluster is prepared to be updated. For example, the first set of cluster-level prechecks may analyze a network configuration of the data management cluster—e.g., to determine if the data management cluster has the proper software installed for the update. The update prechecks may also include a second set of node-level prechecks used to determine whether the individual storage nodes of the data management cluster are prepared to be updated. For example, the second set of node-level prechecks may analyze available storage capacity in the storage nodes to determine whether the storage nodes have enough storage to support an update.

In some examples, the update prechecks include a first set of cluster-level prechecks and node-level prechecks for updating the data management cluster using a disruptive update procedure. And a second set of cluster-level prechecks and node-level prechecks for updating the data management cluster using a non-disruptive update procedure. In some examples, the second set of cluster-level prechecks are used to determine whether the data management cluster is configured with a floating IP (e.g., for GUI access) and whether any live mounts supported by the data management cluster are configured with a floating IP. A floating IP may allow the GUI, live mounts, or both to be accessed at a different location while the GUI and/or live mounts are temporarily unavailable. A live mount may refer to a version of a database that is mounted at the data management cluster and accessible from an external network. Additionally, or alternatively, the second set of node-level prechecks may be used to determine whether the storage nodes have a threshold amount of available capacity that is larger than the first set of node-level prechecks performed for the disruptive update procedure.

In some examples, based on the prechecks, the data management cluster may determine that the data management cluster is prepared to be updated using one or both of a disruptive update or a non-disruptive update. In some examples, based on the prechecks the data management cluster may determine that the data management cluster is not prepared to be updated using either update. In some examples, based on the prechecks, the data management cluster may determine that the data management cluster is not prepared to perform an update type preferred by a customer (e.g., a non-disruptive update) but is prepared to perform an update type not preferred by the customer (e.g., a disruptive update, or vice versa)—e.g., based on a previous selection of the user.

At 310, the results of the prechecks may be provided (e.g., by the data management cluster or driving node) to the user interface 302. In some examples, the data management cluster may send an indication that the data management cluster is prepared to be updated using a disruptive update technique, using a non-disruptive update technique, or both. Alternatively, the data management cluster may send an indication that the data management cluster is not prepared to be updated using either update technique. In some examples, the indication may indicate issues preventing the data management cluster from being prepared for the disruptive update, from being prepared for the non-disruptive update, or both. In some cases, the indication may also include recommendations for addressing the issues. In some examples, the data management cluster may indicate that, though the data management cluster is not prepared to perform the update using an updated type preferred by the customer (e.g., a non-disruptive update), the data management cluster is prepared to perform the update using an update type not preferred by the customer (e.g., a disruptive update). In yet other examples, the data management cluster may indicate the result of the prechecks only for the preferred update type previously indicated by the customer.

At 315, a selection of one of the update types may be received via the user interface 302. In some examples, the selection may request that a non-disruptive update be performed for the data management cluster. If the data management cluster previously indicated that the data management cluster was not prepared for a non-disruptive update, the selection may also include an indication that the issues preventing the non-disruptive update have been addressed.

At 320, a rolling update may be initiated at the data management cluster—e.g., based on receiving a selection from the customer selecting the non-disruptive update, a default preference of the customer, etc. In some examples, before initiating the rolling update, the data management cluster may confirm that the issues previously preventing the non-disruptive update have been addressed. Based on initiating the rolling update, the storage nodes 385 (or groups of the storage nodes 385) may be updated one-by-one. Prior to updating each of the storage nodes 385, a node-specific precheck may be performed. In some examples, prior to updating particular storage nodes of the storage nodes 385, a node-specific precheck may be performed.

At 325, the rolling update may reach the xth storage node 385-x, and a node-specific precheck may be performed for the xth storage node 385-x prior to the xth storage node 385-x being updated. The node-specific precheck may be configured to confirm that the xth storage node 385-x has sufficient storage space to support installing the update version. The node-specific precheck may also be configured to confirm that live mounts supported by the xth storage node 385-x are configured with a floating IP. In some examples, the xth storage node 385-x marks the halfway point in the rolling update (e.g., the xth storage node 385-x is the fourth storage node in a cluster of eight storage nodes). Based on the node-specific precheck, it may be determined that the xth storage node 385-x is prepared to install the update version. Alternatively, it may be determined that the xth storage node 385-x is not prepared to install the update version.

At 330, the update may be delayed (e.g., by the data management cluster or driving node) for the xth storage node 385-x—e.g., based on the node-specific precheck identifying one or more issues to be addressed before the xth storage node 385-x is updated.

At 335, the results of the node-specific precheck may be provided (e.g., by the data management cluster or driving node) to the user interface 302. The results may indicate that the rolling update has been delayed. The results may include an indication of the storage node for which the rolling update is delayed (the xth storage node 385-x). The results may also indicate one or more issues with the xth storage node 385-x causing the delay as well as one or more recommendation for resolving the issues.

In some examples, the results of the node-specific precheck may be provided even if the update is not delayed for the xth storage node 385-x. For example, the results may indicate that the update can proceed but that the customer should restart certain services when the rolling update completes.

At 340, a response may be received via the user interface 302. In some examples, the response indicates that the issues in the xth storage node 385-x have been resolved. In some examples, to resolve the issue, the user may terminate certain services supported by the xth storage node 385-x—e.g., a live mount at the xth storage node 385-x.

At 345, the update version may be installed at the xth storage node 385-x. If the update was delayed, prior to installing the update version, the data management cluster may confirm that the issues that previously delayed the update for the xth storage node 385-x have been addressed. After installing the update version at the xth storage node 385-x, the rolling update may proceed to the next storage node. In some examples, the data management cluster may perform node-specific prechecks for the next storage node before updating the next storage node. And so on.

Figure 4:
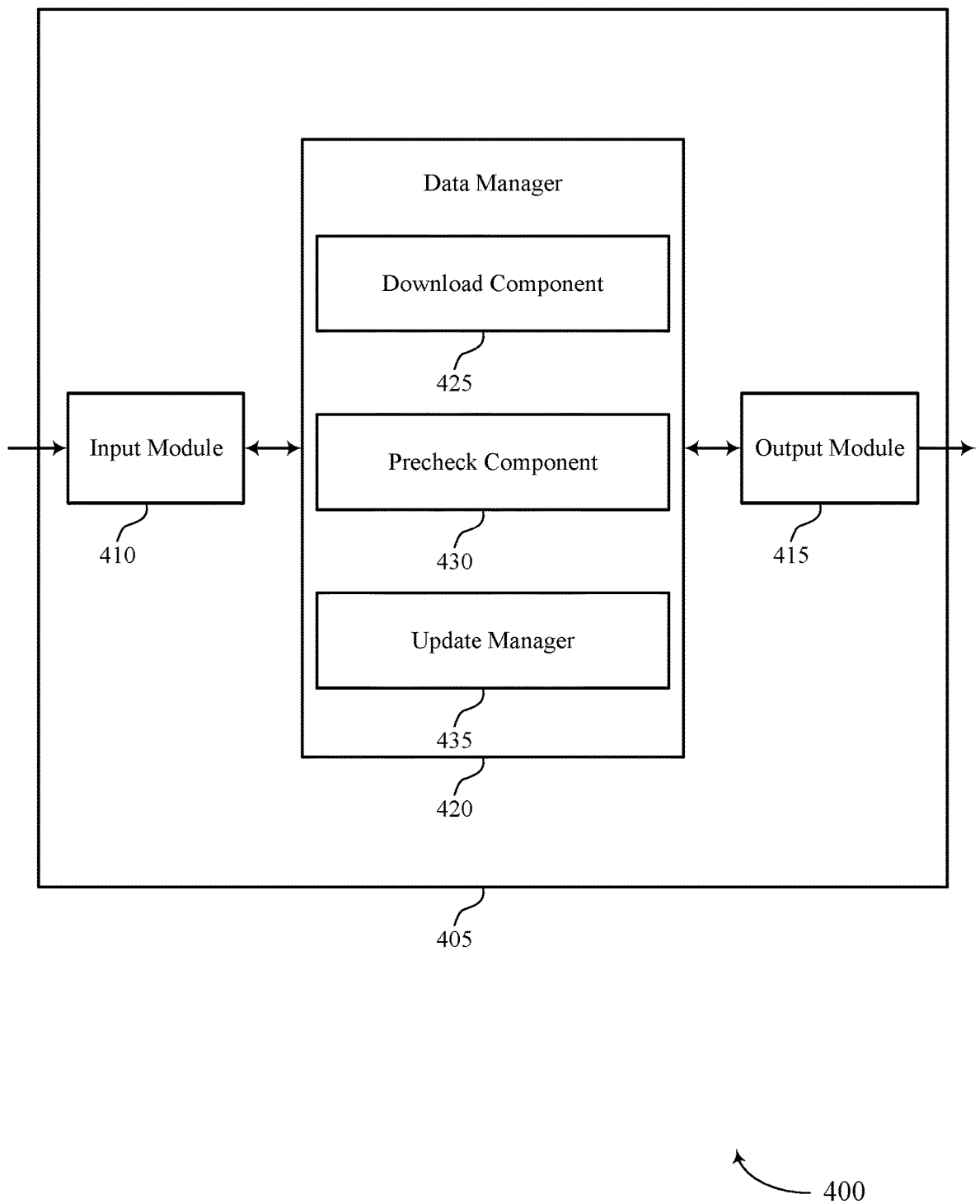
FIG. 4 shows a block diagram of an apparatus that supports prechecking for non-disruptive update of a data management system in accordance with aspects of the present disclosure.

FIG. 4 shows a block diagram 400 of a system 405 that supports prechecking for non-disruptive update of a data management system in accordance with aspects of the present disclosure. In some examples, the system 405 may be an example of aspects of one or more components described with reference to FIG. 1, such as a DMS 110 or a driving storage node. The system 405 may include an input interface 410, an output interface 415, and a data manager 420. The system 405 may also include one or more processors. Each of these components may be in communication with one another (e.g., via one or more buses, communications links, communications interfaces, or any combination thereof).

The input interface 410 may manage input signaling for the system 405. For example, the input interface 410 may receive input signaling (e.g., messages, packets, data, instructions, commands, or any other form of encoded information) from other systems or devices. The input interface 410 may send signaling corresponding to (e.g., representative of or otherwise based on) such input signaling to other components of the system 405 for processing. For example, the input interface 410 may transmit such corresponding signaling to the data manager 420 to support prechecking for non-disruptive update of a data management system. In some cases, the input interface 410 may be a component of a network interface 615 as described with reference to FIG. 6.

The output interface 415 may manage output signaling for the system 405. For example, the output interface 415 may receive signaling from other components of the system 405, such as the data manager 420, and may transmit such output signaling corresponding to (e.g., representative of or otherwise based on) such signaling to other systems or devices. In some cases, the output interface 415 may be a component of a network interface 615 as described with reference to FIG. 6.

The data manager 420 may include a download component 425, a precheck component 430, an update manager 435, or any combination thereof. In some examples, the data manager 420, or various components thereof, may be configured to perform various operations (e.g., receiving, monitoring, transmitting) using or otherwise in cooperation with the input interface 410, the output interface 415, or both. For example, the data manager 420 may receive information from the input interface 410, send information to the output interface 415, or be integrated in combination with the input interface 410, the output interface 415, or both to receive information, transmit information, or perform various other operations as described herein.

The download component 425 may be configured as or otherwise support a means for obtaining, by a data management system, information for updating software for a cluster of storage nodes from a first version to a second version, where the cluster of storage nodes includes a set of multiple storage nodes. The precheck component 430 may be configured as or otherwise support a means for performing, by the data management system based on obtaining the information for updating the software, a cluster-level precheck procedure that spans the set of multiple storage nodes prior to initiating an update procedure for the cluster of storage nodes. The precheck component 430 may be configured as or otherwise support a means for performing, by the data management system during the update procedure for the cluster of storage nodes and prior to initiating an update of a storage node of the set of multiple storage nodes, a node-level precheck procedure to determine whether the storage node is in a state for successful update. The update manager 435 may be configured as or otherwise support a means for determining, by the data management system, whether to delay the update of the storage node based on a result of the node-level precheck procedure for the storage node.

Figure 5:
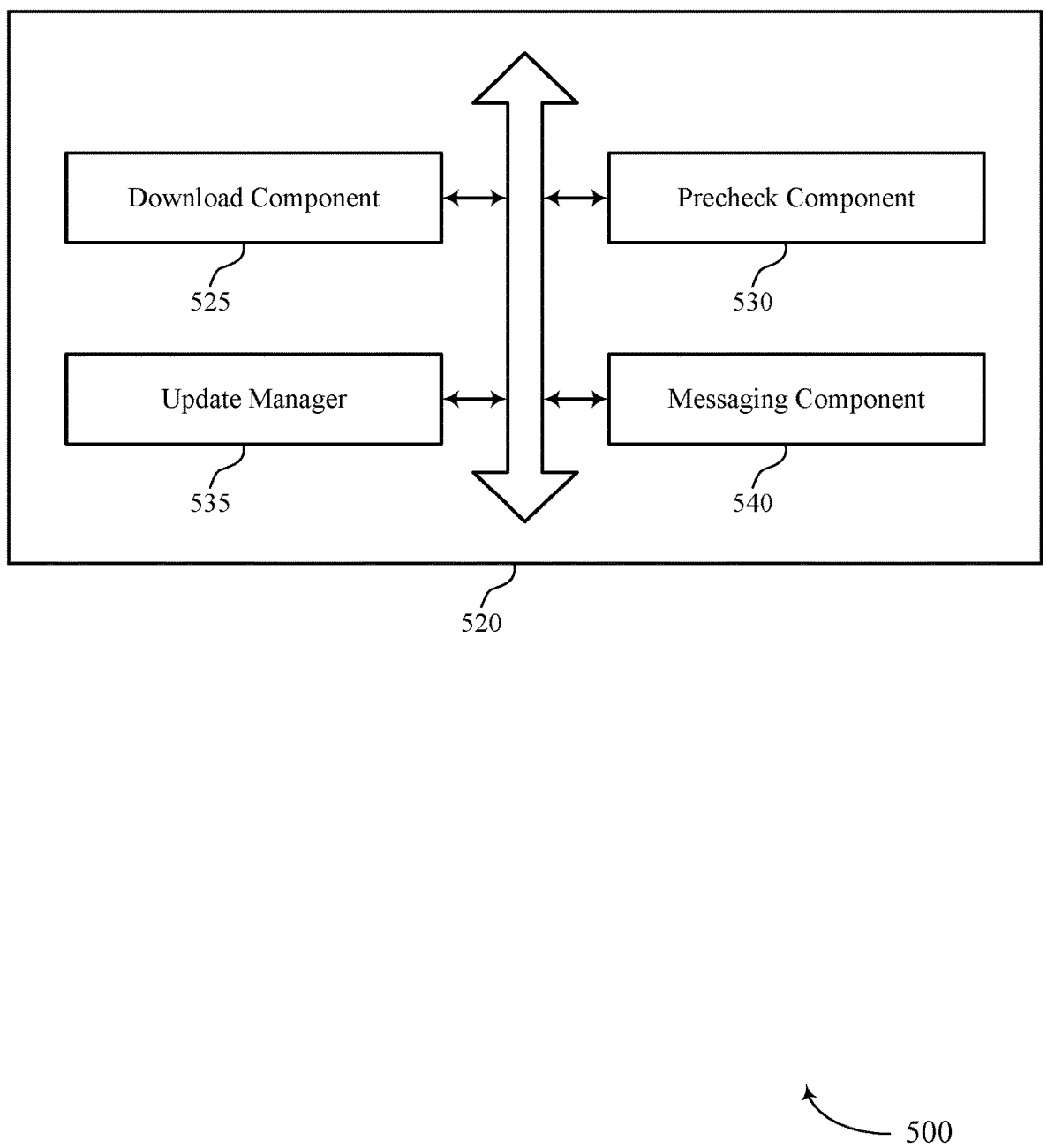
FIG. 5 shows a block diagram of a storage manager that supports prechecking for non-disruptive update of a data management system in accordance with aspects of the present disclosure.

FIG. 5 shows a block diagram 500 of a data manager 520 that supports prechecking for non-disruptive update of a data management system in accordance with aspects of the present disclosure. The data manager 520 may be an example of or include aspects of a data manager 420 as described herein. The data manager 520, or various components thereof, may be an example of means for performing various aspects of techniques for prechecking for non-disruptive update of a data management system as described herein. For example, the data manager 520 may include a download component 525, a precheck component 530, an update manager 535, a messaging component 540, or any combination thereof. Each of these components may communicate, directly or indirectly, with one another (e.g., via one or more buses, communications links, communications interfaces, or any combination thereof).

The download component 525 may be configured as or otherwise support a means for obtaining, by a data management system, information for updating software for a cluster of storage nodes from a first version to a second version, where the cluster of storage nodes includes a set of multiple storage nodes. The precheck component 530 may be configured as or otherwise support a means for performing, by the data management system based on obtaining the information for updating the software, a cluster-level precheck procedure that spans the set of multiple storage nodes prior to initiating an update procedure for the cluster of storage nodes. In some examples, the precheck component 530 may be configured as or otherwise support a means for performing, by the data management system during the update procedure for the cluster of storage nodes and prior to initiating an update of a storage node of the set of multiple storage nodes, a node-level precheck procedure to determine whether the storage node is in a state for successful update. The update manager 535 may be configured as or otherwise support a means for determining, by the data management system, whether to delay the update of the storage node based on a result of the node-level precheck procedure for the storage node.

In some examples, the precheck component 530 may be configured as or otherwise support a means for determining, based on the node-level precheck procedure, that the storage node is in the state for successful update. In some examples, the update manager 535 may be configured as or otherwise support a means for initiating the update of the storage node based on determining that the storage node is in the state for successful update.

In some examples, the precheck component 530 may be configured as or otherwise support a means for performing, by the data management system based on obtaining the information for updating the software, an initial node-level precheck procedure prior to initiating the update procedure for the cluster of storage nodes. In some examples, the update manager 535 may be configured as or otherwise support a means for initiating the update procedure for the cluster of storage nodes based on the cluster-level precheck procedure and the initial node-level precheck procedure indicating that the cluster of storage nodes is in the state for successful update.

In some examples, after the update procedure for the cluster of storage nodes is initiated, the storage node exits the state for successful update, and the precheck component 530 may be configured as or otherwise support a means for determining, based on the node-level precheck procedure, that the storage node is no longer in the state for successful update. The update manager 535 may also be configured as or otherwise support a means for delaying the update of the storage node based on determining that the storage node is no longer in the state for successful update. The messaging component 540 may also be configured as or otherwise support a means for providing, via a user interface, an indication that the update is delayed.

In some examples, the indication indicates an error associated with the storage node exiting the state for successful update. In some examples, the error includes a storage space deficiency, an incorrect network configuration of the storage node, an incorrect network configuration of a virtual machine running on the storage node, or any combination thereof.

In some examples, the messaging component 540 may be configured as or otherwise support a means for receiving, via the user interface, a response indicating that the storage node has reentered the state for successful update. In some examples, the update manager 535 may be configured as or otherwise support a means for initiating the update of the storage node based on receiving the response.

In some examples, the precheck component 530 may be configured as or otherwise support a means for performing a first precheck procedure for determining whether the cluster of storage nodes is in a first state for successful update using a first type of update procedure associated with updating each storage node of the cluster of storage nodes in parallel, the first precheck procedure including a second cluster-level precheck procedure. In some examples, the precheck component 530 may be configured as or otherwise support a means for performing a second precheck procedure for determining whether the cluster of storage nodes is in a second state for successful update using a second type of update procedure associated with updating storage nodes of the cluster of storage nodes in series, the second precheck procedure including the cluster-level precheck procedure and an initial node-level precheck procedure.

In some examples, the messaging component 540 may be configured as or otherwise support a means for indicating, via a user interface, whether the cluster of storage nodes is in the first state for successful update using the first type of update procedure, whether the cluster of storage nodes is in the second state for successful update using the second type of update procedure, or both, based on performing the first precheck procedure and the second precheck procedure.

In some examples, the update manager 535 may be configured as or otherwise support a means for determining that the second type of update procedure is configured for the cluster of storage nodes. In some examples, the precheck component 530 may be configured as or otherwise support a means for determining, based on the second precheck procedure, that the cluster of storage nodes is in the second state for successful update using the second type of update procedure. In some examples, the update manager 535 may be configured as or otherwise support a means for initiating, based on determining that the cluster of storage nodes is in the second state for successful update using the second type of update procedure, the update procedure for the cluster of storage nodes in accordance with the second type of update procedure.

In some examples, the messaging component 540 may be configured as or otherwise support a means for receiving, via a user interface and prior to performing the first precheck procedure and the second precheck procedure, a selection of the first type of update procedure associated with updating each storage node of the cluster of storage nodes in parallel. In some examples, the precheck component 530 may be configured as or otherwise support a means for determining, based on the first precheck procedure, that the cluster of storage nodes is not in the first state for successful update using the first type of update procedure. In some examples, the precheck component 530 may be configured as or otherwise support a means for determining, based on the second precheck procedure, that the cluster of storage nodes is in the second state for successful update using the second type of update procedure associated with updating the storage nodes of the cluster of storage nodes in series. In some examples, the messaging component 540 may be configured as or otherwise support a means for indicating, via the user interface, that the cluster of storage nodes is not in the first state for successful update using the first type of update procedure but is in the second state for successful update using the second type of update procedure.

In some examples, the messaging component 540 may be configured as or otherwise support a means for receiving, via the user interface, a response selecting the second type of update procedure. In some examples, the update manager 535 may be configured as or otherwise support a means for initiating the update procedure in accordance with the second type of update procedure based on the response and determining that the cluster of storage nodes is in the second state for successful update.

In some examples, the messaging component 540 may be configured as or otherwise support a means for receiving, via the user interface, a response indicating that the cluster of storage nodes has reentered the second state for successful update using the second type of update procedure. In some examples, the update manager 535 may be configured as or otherwise support a means for initiating the update procedure in accordance with the second type of update procedure based on the response.

In some examples, the messaging component 540 may be configured as or otherwise support a means for receiving, via a user interface and prior to performing the first precheck procedure and the second precheck procedure, a selection of the second type of update procedure associated with updating the storage nodes of the cluster of storage nodes in series. In some examples, the precheck component 530 may be configured as or otherwise support a means for determining, based on the second precheck procedure, that the cluster of storage nodes is not in the second state for successful update using the second type of update procedure associated with updating the storage nodes of the cluster of storage nodes in series. In some examples, the messaging component 540 may be configured as or otherwise support a means for indicating, via the user interface, that the cluster of storage nodes is not in the second state for successful update using the second type of update procedure.

Figure 6:
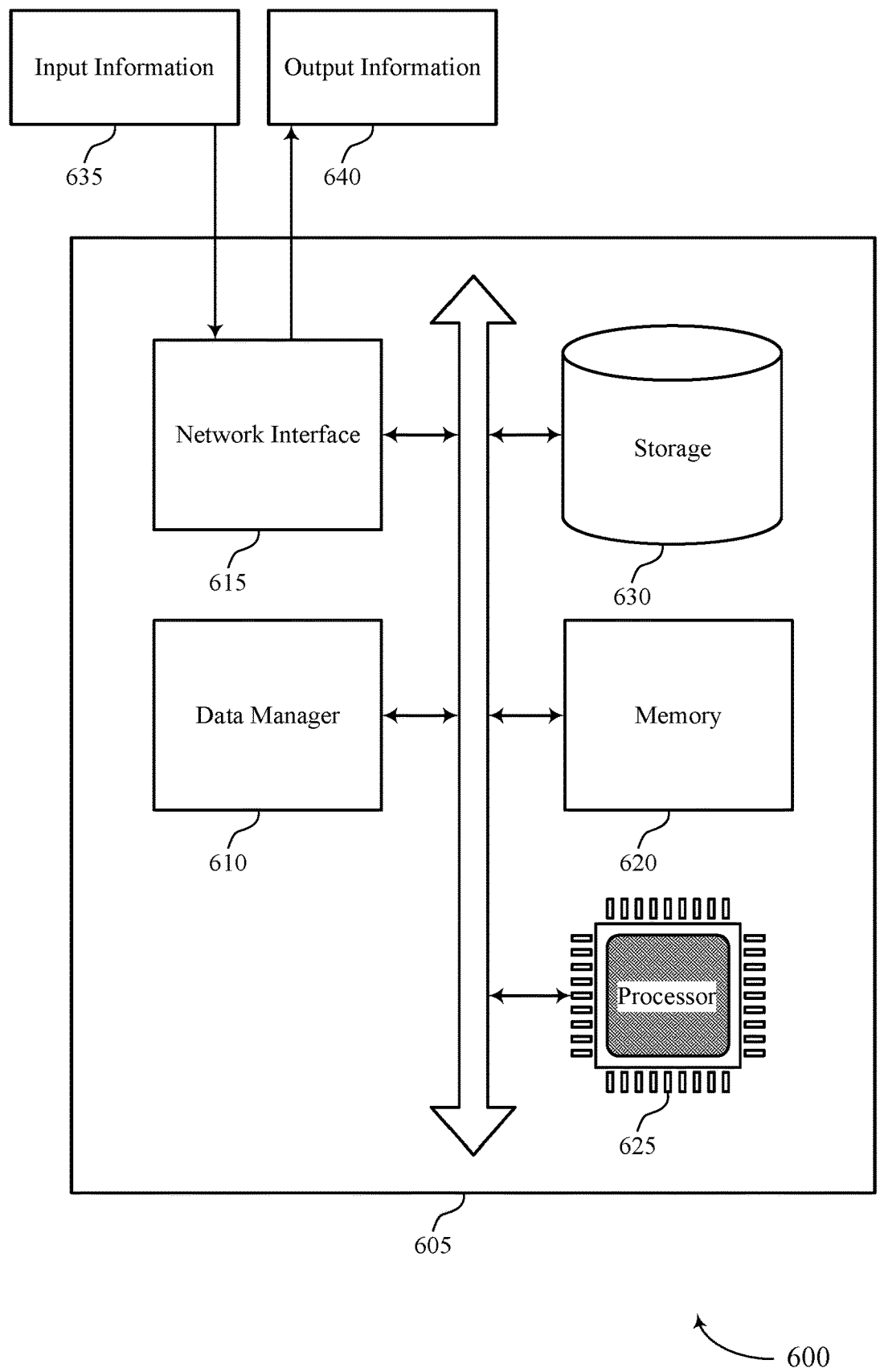
FIG. 6 shows a block diagram of a system including a device that supports prechecking for non-disruptive update of a data management system in accordance with aspects of the present disclosure.

FIG. 6 shows a block diagram 600 of a system 605 that supports prechecking for non-disruptive update of a data management system in accordance with aspects of the present disclosure. The system 605 may be an example of or include aspects of a system 405 as described herein. The system 605 may include components for data management, including components such as a data manager 610, a network interface 615, memory 620, processor 625, and storage 630. These components may be in electronic communication or otherwise coupled with each other (e.g., operatively, communicatively, functionally, electronically, electrically; via one or more buses, communications links, communications interfaces, or any combination thereof). Additionally, the components of the system 605 may comprise corresponding physical components or may be implemented as corresponding virtual components (e.g., components of one or more virtual machines). In some examples, the system 605 may be an example of aspects of one or more components described with reference to FIG. 1, such as a DMS 110 or a driving storage node.

The network interface 615 may enable the system 605 to exchange information (e.g., input information 635, output information 640, or both) with other systems or devices (not shown). For example, the network interface 615 may enable the system 605 to connect to a network (e.g., a network 120 as described herein). The network interface 615 may include one or more wireless network interfaces, one or more wired network interfaces, or any combination thereof. In some examples, the network interface 615 may be an example of may be an example of aspects of one or more components described with reference to FIG. 1, such as one or more network interfaces 165.

Memory 620 may include RAM, ROM, or both. The memory 620 may store computer-readable, computer-executable software including instructions that, when executed, cause the processor 625 to perform various functions described herein. In some cases, the memory 620 may contain, among other things, a basic input/output system (BIOS), which may control basic hardware or software operation such as the interaction with peripheral components or devices. In some cases, the memory 620 may be an example of aspects of one or more components described with reference to FIG. 1, such as one or more memories 175.

The processor 625 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). The processor 625 may be configured to execute computer-readable instructions stored in a memory 620 to perform various functions (e.g., functions or tasks supporting prechecking for non-disruptive update of a data management system). Though a single processor 625 is depicted in the example of FIG. 6, it is to be understood that the system 605 may include any quantity of one or more of processors 625 and that a group of processors 625 may collectively perform one or more functions ascribed herein to a processor, such as the processor 625. In some cases, the processor 625 may be an example of aspects of one or more components described with reference to FIG. 1, such as one or more processors 170.

Storage 630 may be configured to store data that is generated, processed, stored, or otherwise used by the system 605. In some cases, the storage 630 may include one or more HDDs, one or more SDDs, or both. In some examples, the storage 630 may be an example of a single database, a distributed database, multiple distributed databases, a data store, a data lake, or an emergency backup database. In some examples, the storage 630 may be an example of one or more components described with reference to FIG. 1, such as one or more network disks 180.

For example, the data manager 610 may be configured as or otherwise support a means for obtaining, by a data management system, information for updating software for a cluster of storage nodes from a first version to a second version, where the cluster of storage nodes includes a set of multiple storage nodes. The data manager 610 may be configured as or otherwise support a means for performing, by the data management system based on obtaining the information for updating the software, a cluster-level precheck procedure that spans the set of multiple storage nodes prior to initiating an update procedure for the cluster of storage nodes. The data manager 610 may be configured as or otherwise support a means for performing, by the data management system during the update procedure for the cluster of storage nodes and prior to initiating an update of a storage node of the set of multiple storage nodes, a node-level precheck procedure to determine whether the storage node is in a state for successful update. The data manager 610 may be configured as or otherwise support a means for determining, by the data management system, whether to delay the update of the storage node based on a result of the node-level precheck procedure for the storage node.

Figure 7:
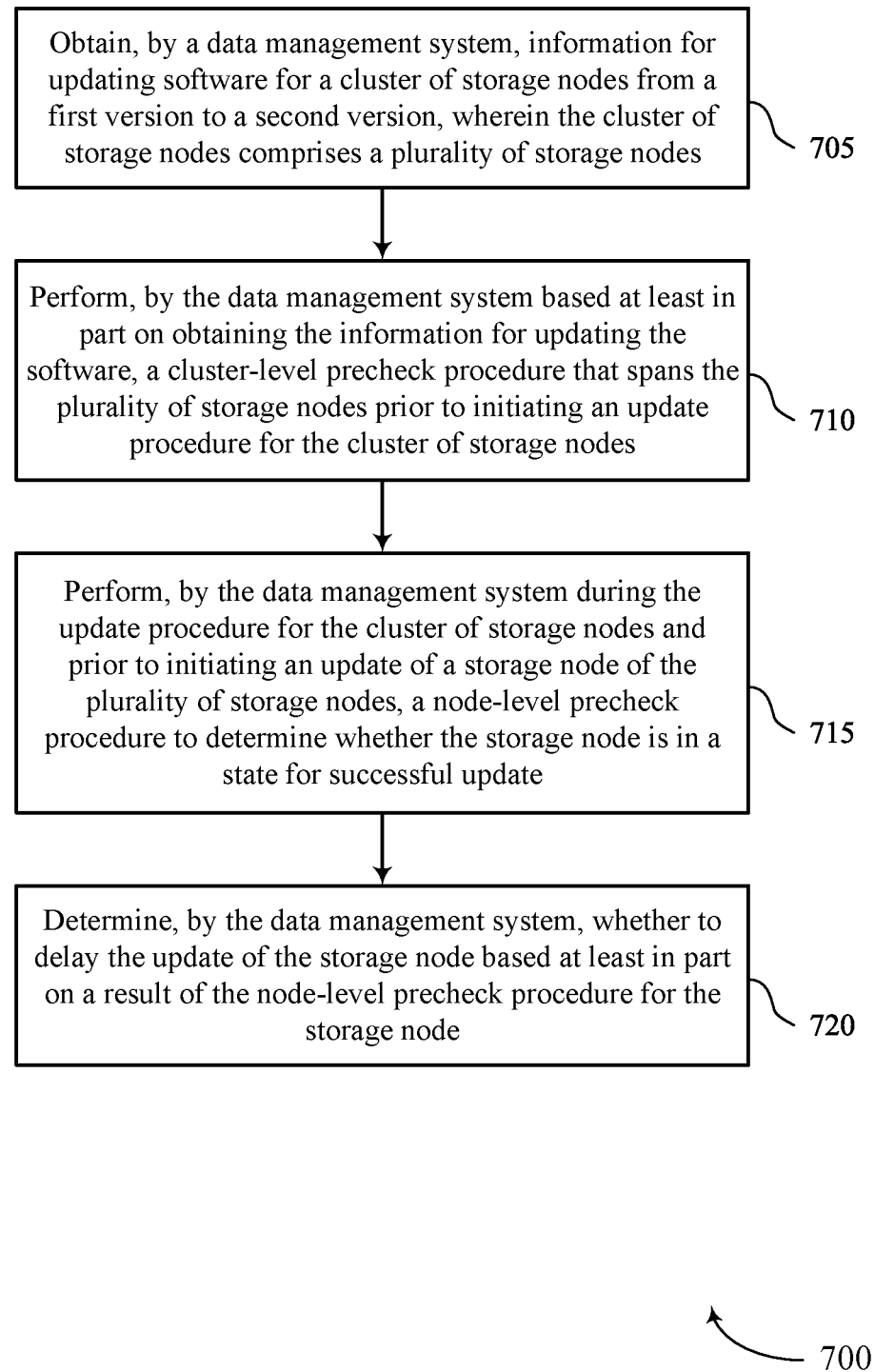
FIG. 7 shows a flowchart illustrating methods that support prechecking for non-disruptive update of a data management system in accordance with aspects of the present disclosure.

FIG. 7 shows a flowchart illustrating a method 700 that supports techniques for prechecking for non-disruptive update of a data management system in accordance with aspects of the present disclosure. The operations of the method 700 may be implemented by a system or its components as described herein. For example, the operations of the method 700 may be performed by a DMS or driving storage node as described with reference to FIGS. 1 through 6. In some examples, a DMS or driving storage node may execute a set of instructions to control the functional elements of the DMS or driving storage node to perform the described functions. Additionally, or alternatively, the DMS or driving storage node may perform aspects of the described functions using special-purpose hardware.

At 705, the method may include obtaining, by a data management system, information for updating software for a cluster of storage nodes from a first version to a second version, where the cluster of storage nodes includes a set of multiple storage nodes. The operations of 705 may be performed in accordance with examples as disclosed herein. In some examples, aspects of the operations of 705 may be performed by a download component 525 as described with reference to FIG. 5.

At 710, the method may include performing, by the data management system based on obtaining the information for updating the software, a cluster-level precheck procedure that spans the set of multiple storage nodes prior to initiating an update procedure for the cluster of storage nodes. The operations of 710 may be performed in accordance with examples as disclosed herein. In some examples, aspects of the operations of 710 may be performed by a precheck component 530 as described with reference to FIG. 5.

At 715, the method may include performing, by the data management system during the update procedure for the cluster of storage nodes and prior to initiating an update of a storage node of the set of multiple storage nodes, a node-level precheck procedure to determine whether the storage node is in a state for successful update. The operations of 715 may be performed in accordance with examples as disclosed herein. In some examples, aspects of the operations of 715 may be performed by a precheck component 530 as described with reference to FIG. 5.

At 720, the method may include determining, by the data management system, whether to delay the update of the storage node based on a result of the node-level precheck procedure for the storage node. The operations of 720 may be performed in accordance with examples as disclosed herein. In some examples, aspects of the operations of 720 may be performed by an update manager 535 as described with reference to FIG. 5.

A method is described. The method may include obtaining, by a data management system, information for updating software for a cluster of storage nodes from a first version to a second version, where the cluster of storage nodes includes a set of multiple storage nodes, performing, by the data management system based on obtaining the information for updating the software, a cluster-level precheck procedure that spans the set of multiple storage nodes prior to initiating an update procedure for the cluster of storage nodes, performing, by the data management system during the update procedure for the cluster of storage nodes and prior to initiating an update of a storage node of the set of multiple storage nodes, a node-level precheck procedure to determine whether the storage node is in a state for successful update, and determining, by the data management system, whether to delay the update of the storage node based on a result of the node-level precheck procedure for the storage node.

An apparatus is described. The apparatus may include a processor, memory coupled with the processor, and instructions stored in the memory. The instructions may be executable by the processor to cause the apparatus to obtain, by a data management system, information for updating software for a cluster of storage nodes from a first version to a second version, where the cluster of storage nodes includes a set of multiple storage nodes, perform, by the data management system based on obtaining the information for updating the software, a cluster-level precheck procedure that spans the set of multiple storage nodes prior to initiating an update procedure for the cluster of storage nodes, perform, by the data management system during the update procedure for the cluster of storage nodes and prior to initiating an update of a storage node of the set of multiple storage nodes, a node-level precheck procedure to determine whether the storage node is in a state for successful update, and determine, by the data management system, whether to delay the update of the storage node based on a result of the node-level precheck procedure for the storage node.

Another apparatus is described. The apparatus may include means for obtaining, by a data management system, information for updating software for a cluster of storage nodes from a first version to a second version, where the cluster of storage nodes includes a set of multiple storage nodes, means for performing, by the data management system based on obtaining the information for updating the software, a cluster-level precheck procedure that spans the set of multiple storage nodes prior to initiating an update procedure for the cluster of storage nodes, means for performing, by the data management system during the update procedure for the cluster of storage nodes and prior to initiating an update of a storage node of the set of multiple storage nodes, a node-level precheck procedure to determine whether the storage node is in a state for successful update, and means for determining, by the data management system, whether to delay the update of the storage node based on a result of the node-level precheck procedure for the storage node.

A non-transitory computer-readable medium storing code is described. The code may include instructions executable by a processor to obtain, by a data management system, information for updating software for a cluster of storage nodes from a first version to a second version, where the cluster of storage nodes includes a set of multiple storage nodes, perform, by the data management system based on obtaining the information for updating the software, a cluster-level precheck procedure that spans the set of multiple storage nodes prior to initiating an update procedure for the cluster of storage nodes, perform, by the data management system during the update procedure for the cluster of storage nodes and prior to initiating an update of a storage node of the set of multiple storage nodes, a node-level precheck procedure to determine whether the storage node is in a state for successful update, and determine, by the data management system, whether to delay the update of the storage node based on a result of the node-level precheck procedure for the storage node.

Some examples of the method, apparatuses, and non-transitory computer-readable medium described herein may further include operations, features, means, or instructions for determining, based on the node-level precheck procedure, that the storage node may be in the state for successful update and initiating the update of the storage node based on determining that the storage node may be in the state for successful update.

Some examples of the method, apparatuses, and non-transitory computer-readable medium described herein may further include operations, features, means, or instructions for performing, by the data management system based on obtaining the information for updating the software, an initial node-level precheck procedure prior to initiating the update procedure for the cluster of storage nodes and initiating the update procedure for the cluster of storage nodes based on the cluster-level precheck procedure and the initial node-level precheck procedure indicating that the cluster of storage nodes may be in the state for successful update.

In some examples of the method, apparatuses, and non-transitory computer-readable medium described herein, after the update procedure for the cluster of storage nodes is initiated, the storage node exits the state for successful update, and the method, apparatuses, and non-transitory computer-readable medium may include further operations, features, means, or instructions for determining, based on the node-level precheck procedure, that the storage node may be no longer in the state for successful update, delaying the update of the storage node based on determining that the storage node may be no longer in the state for successful update, and providing, via a user interface, an indication that the update may be delayed.

In some examples of the method, apparatuses, and non-transitory computer-readable medium described herein, the indication indicates an error associated with the storage node exiting the state for successful update and the error includes a storage space deficiency, an incorrect network configuration of the storage node, an incorrect network configuration of a virtual machine running on the storage node, or any combination thereof.

Some examples of the method, apparatuses, and non-transitory computer-readable medium described herein may further include operations, features, means, or instructions for receiving, via the user interface, a response indicating that the storage node may have reentered the state for successful update and initiating the update of the storage node based on receiving the response.

Some examples of the method, apparatuses, and non-transitory computer-readable medium described herein may further include operations, features, means, or instructions for performing a first precheck procedure for determining whether the cluster of storage nodes may be in a first state for successful update using a first type of update procedure associated with updating each storage node of the cluster of storage nodes in parallel, the first precheck procedure including a second cluster-level precheck procedure and performing a second precheck procedure for determining whether the cluster of storage nodes may be in a second state for successful update using a second type of update procedure associated with updating storage nodes of the cluster of storage nodes in series, the second precheck procedure including the cluster-level precheck procedure and an initial node-level precheck procedure.

Some examples of the method, apparatuses, and non-transitory computer-readable medium described herein may further include operations, features, means, or instructions for indicating, via a user interface, whether the cluster of storage nodes may be in the first state for successful update using the first type of update procedure, whether the cluster of storage nodes may be in the second state for successful update using the second type of update procedure, or both, based on performing the first precheck procedure and the second precheck procedure.

Some examples of the method, apparatuses, and non-transitory computer-readable medium described herein may further include operations, features, means, or instructions for determining that the second type of update procedure may be configured for the cluster of storage nodes, determining, based on the second precheck procedure, that the cluster of storage nodes may be in the second state for successful update using the second type of update procedure, and initiating, based on determining that the cluster of storage nodes may be in the second state for successful update using the second type of update procedure, the update procedure for the cluster of storage nodes in accordance with the second type of update procedure.

Some examples of the method, apparatuses, and non-transitory computer-readable medium described herein may further include operations, features, means, or instructions for receiving, via a user interface and prior to performing the first precheck procedure and the second precheck procedure, a selection of the first type of update procedure associated with updating each storage node of the cluster of storage nodes in parallel, determining, based on the first precheck procedure, that the cluster of storage nodes may be not in the first state for successful update using the first type of update procedure, determining, based on the second precheck procedure, that the cluster of storage nodes may be in the second state for successful update using the second type of update procedure associated with updating the storage nodes of the cluster of storage nodes in series, and indicating, via the user interface, that the cluster of storage nodes may be not in the first state for successful update using the first type of update procedure but may be in the second state for successful update using the second type of update procedure.

Some examples of the method, apparatuses, and non-transitory computer-readable medium described herein may further include operations, features, means, or instructions for receiving, via the user interface, a response selecting the second type of update procedure and initiating the update procedure in accordance with the second type of update procedure based on the response and determining that the cluster of storage nodes may be in the second state for successful update.

Some examples of the method, apparatuses, and non-transitory computer-readable medium described herein may further include operations, features, means, or instructions for receiving, via the user interface, a response indicating that the cluster of storage nodes may have reentered the second state for successful update using the second type of update procedure and initiating the update procedure in accordance with the second type of update procedure based on the response.

Some examples of the method, apparatuses, and non-transitory computer-readable medium described herein may further include operations, features, means, or instructions for receiving, via a user interface and prior to performing the first precheck procedure and the second precheck procedure, a selection of the second type of update procedure associated with updating the storage nodes of the cluster of storage nodes in series, determining, based on the second precheck procedure, that the cluster of storage nodes may be not in the second state for successful update using the second type of update procedure associated with updating the storage nodes of the cluster of storage nodes in series, and indicating, via the user interface, that the cluster of storage nodes may be not in the second state for successful update using the second type of update procedure.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
    obtaining, by a data management system, information for updating software for a cluster of storage nodes from a first version to a second version, wherein the cluster of storage nodes comprises a plurality of storage nodes;
    performing, by the data management system based at least in part on obtaining the information for updating the software, a cluster-level precheck procedure that spans the plurality of storage nodes prior to initiating an update procedure for the cluster of storage nodes;
    performing, by the data management system during the update procedure for the cluster of storage nodes and prior to initiating an update of a storage node of the plurality of storage nodes, a node-level precheck procedure to determine whether the storage node is in a state for successful update; and
    determining, by the data management system, whether to delay the update of the storage node based at least in part on a result of the node-level precheck procedure for the storage node.

2. The method of claim 1, further comprising:
    determining, based at least in part on the node-level precheck procedure, that the storage node is in the state for successful update; and
    initiating the update of the storage node based at least in part on determining that the storage node is in the state for successful update.

3. The method of claim 1, further comprising:
    performing, by the data management system based at least in part on obtaining the information for updating the software, an initial node-level precheck procedure prior to initiating the update procedure for the cluster of storage nodes; and
    initiating the update procedure for the cluster of storage nodes based at least in part on the cluster-level precheck procedure and the initial node-level precheck procedure indicating that the cluster of storage nodes is in the state for successful update.

4. The method of claim 1, wherein, after the update procedure for the cluster of storage nodes is initiated, the storage node exits the state for successful update, the method further comprising:
    determining, based at least in part on the node-level precheck procedure, that the storage node is no longer in the state for successful update;
    delaying the update of the storage node based at least in part on determining that the storage node is no longer in the state for successful update; and
    providing, via a user interface, an indication that the update is delayed.

5. The method of claim 4, wherein the indication indicates an error associated with the storage node exiting the state for successful update, and wherein the error comprises a storage space deficiency, an incorrect network configuration of the storage node, an incorrect network configuration of a virtual machine running on the storage node, or any combination thereof.

6. The method of claim 4, further comprising:
    receiving, via the user interface, a response indicating that the storage node has reentered the state for successful update; and
    initiating the update of the storage node based at least in part on receiving the response.

7. The method of claim 1, further comprising:
    performing a first precheck procedure for determining whether the cluster of storage nodes is in a first state for successful update using a first type of update procedure associated with updating each storage node of the cluster of storage nodes in parallel, the first precheck procedure comprising a second cluster-level precheck procedure; and
    performing a second precheck procedure for determining whether the cluster of storage nodes is in a second state for successful update using a second type of update procedure associated with updating storage nodes of the cluster of storage nodes in series, the second precheck procedure comprising the cluster-level precheck procedure and an initial node-level precheck procedure.

8. The method of claim 7, further comprising:
indicating, via a user interface, whether the cluster of storage nodes is in the first state for successful update using the first type of update procedure, whether the cluster of storage nodes is in the second state for successful update using the second type of update procedure, or both, based at least in part on performing the first precheck procedure and the second precheck procedure.

9. The method of claim 7, further comprising:
determining that the second type of update procedure is configured for the cluster of storage nodes;
determining, based at least in part on the second precheck procedure, that the cluster of storage nodes is in the second state for successful update using the second type of update procedure; and
initiating, based at least in part on determining that the cluster of storage nodes is in the second state for successful update using the second type of update procedure, the update procedure for the cluster of storage nodes in accordance with the second type of update procedure.

10. The method of claim 7, further comprising:
receiving, via a user interface and prior to performing the first precheck procedure and the second precheck procedure, a selection of the first type of update procedure associated with updating each storage node of the cluster of storage nodes in parallel;
determining, based at least in part on the first precheck procedure, that the cluster of storage nodes is not in the first state for successful update using the first type of update procedure;
determining, based at least in part on the second precheck procedure, that the cluster of storage nodes is in the second state for successful update using the second type of update procedure associated with updating the storage nodes of the cluster of storage nodes in series; and
indicating, via the user interface, that the cluster of storage nodes is not in the first state for successful update using the first type of update procedure but is in the second state for successful update using the second type of update procedure.

11. The method of claim 10, further comprising:
receiving, via the user interface, a response selecting the second type of update procedure; and
initiating the update procedure in accordance with the second type of update procedure based at least in part on the response and determining that the cluster of storage nodes is in the second state for successful update.

12. The method of claim 7, further comprising:
receiving, via a user interface and prior to performing the first precheck procedure and the second precheck procedure, a selection of the second type of update procedure associated with updating the storage nodes of the cluster of storage nodes in series;
determining, based at least in part on the second precheck procedure, that the cluster of storage nodes is not in the second state for successful update using the second type of update procedure associated with updating the storage nodes of the cluster of storage nodes in series; and indicating, via the user interface, that the cluster of storage nodes is not in the second state for successful update using the second type of update procedure.

13. The method of claim 10, further comprising:
receiving, via the user interface, a response indicating that the cluster of storage nodes has reentered the second state for successful update using the second type of update procedure; and
initiating the update procedure in accordance with the second type of update procedure based at least in part on the response.

14. An apparatus, comprising:
a processor; and
a memory coupled with the processor, the memory comprising instructions executable by the processor to cause the apparatus to:
obtain, by a data management system, information for updating software for a cluster of storage nodes from a first version to a second version, wherein the cluster of storage nodes comprises a plurality of storage nodes;
perform, by the data management system based at least in part on obtaining the information for updating the software, a cluster-level precheck procedure that spans the plurality of storage nodes prior to initiating an update procedure for the cluster of storage nodes;
perform, by the data management system during the update procedure for the cluster of storage nodes and prior to initiating an update of a storage node of the plurality of storage nodes, a node-level precheck procedure to determine whether the storage node is in a state for successful update; and
determine, by the data management system, whether to delay the update of the storage node based at least in part on a result of the node-level precheck procedure for the storage node.

15. The apparatus of claim 14, wherein the instructions are further executable by the processor to cause the apparatus to:
determine, based at least in part on the node-level precheck procedure, that the storage node is in the state for successful update; and
initiate the update of the storage node based at least in part on determining that the storage node is in the state for successful update.

16. The apparatus of claim 14, wherein the instructions are further executable by the processor to cause the apparatus to:
perform, by the data management system based at least in part on obtaining the information for updating the software, an initial node-level precheck procedure prior to initiating the update procedure for the cluster of storage nodes; and
initiate the update procedure for the cluster of storage nodes based at least in part on the cluster-level precheck procedure and the initial node-level precheck procedure indicating that the cluster of storage nodes is in the state for successful update.

17. The apparatus of claim 14, wherein the instructions are further executable by the processor to cause the apparatus to:
perform a first precheck procedure for determining whether the cluster of storage nodes is in a first state for successful update using a first type of update procedure associated with updating each storage node of the cluster of storage nodes in parallel, the first precheck procedure comprising a second cluster-level precheck procedure; and perform a second precheck procedure for determining whether the cluster of storage nodes is in a second state for successful update using a second type of update procedure associated with updating storage nodes of the cluster of storage nodes in series, the second precheck procedure comprising the cluster-level precheck procedure and an initial node-level precheck procedure.

18. A non-transitory, computer-readable medium storing code that comprises instructions executable by a processor of an electronic device to cause the electronic device to:

obtain, by a data management system, information for updating software for a cluster of storage nodes from a first version to a second version, wherein the cluster of storage nodes comprises a plurality of storage nodes;

perform, by the data management system based at least in part on obtaining the information for updating the software, a cluster-level precheck procedure that spans the plurality of storage nodes prior to initiating an update procedure for the cluster of storage nodes;

perform, by the data management system during the update procedure for the cluster of storage nodes and prior to initiating an update of a storage node of the plurality of storage nodes, a node-level precheck procedure to determine whether the storage node is in a state for successful update; and determine, by the data management system, whether to delay the update of the storage node based at least in part on a result of the node-level precheck procedure for the storage node.

19. The non-transitory, computer-readable medium of claim 18, wherein the instructions are further executable by the processor to cause the electronic device to:

determine, based at least in part on the node-level precheck procedure, that the storage node is in the state for successful update; and initiate the update of the storage node based at least in part on determining that the storage node is in the state for successful update.

20. The non-transitory, computer-readable medium of claim 18, wherein the instructions are further executable by the processor to cause the electronic device to:

perform, by the data management system based at least in part on obtaining the information for updating the software, an initial node-level precheck procedure prior to initiating the update procedure for the cluster of storage nodes; and initiate the update procedure for the cluster of storage nodes based at least in part on the cluster-level precheck procedure and the initial node-level precheck procedure indicating that the cluster of storage nodes is in the state for successful update.

* * * * *